United States Patent
Dalsgaard et al.

(10) Patent No.: US 10,321,346 B2
(45) Date of Patent: Jun. 11, 2019

(54) CARRIER-BASED RSRQ METRIC FOR EFFICIENT SMALL CELL OFFLOADING

(71) Applicant: Nokia Technologies Oy, Espoo (FI)

(72) Inventors: Lars Dalsgaard, Oulu (FI); Jorma Kaikkonen, Oulu (FI); Sari Kaarina Nielsen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 18 days.

(21) Appl. No.: 14/524,598

(22) Filed: Oct. 27, 2014

(65) Prior Publication Data

US 2015/0131465 A1 May 14, 2015

Related U.S. Application Data

(60) Provisional application No. 61/902,708, filed on Nov. 11, 2013.

(51) Int. Cl.
*H04W 24/10* (2009.01)

(52) U.S. Cl.
CPC .................. *H04W 24/10* (2013.01)

(58) Field of Classification Search
CPC ..................................... H04W 24/10
USPC ......................................... 370/252
See application file for complete search history.

(56) References Cited

U.S. PATENT DOCUMENTS

| | | | |
|---|---|---|---|
| 2013/0114562 A1* | 5/2013 | Seo | H04W 52/146 370/329 |
| 2013/0178216 A1 | 7/2013 | Chang et al. | |
| 2013/0225188 A1 | 8/2013 | Seo et al. | |
| 2014/0200001 A1* | 7/2014 | Song | H04W 36/0094 455/436 |
| 2014/0233408 A1* | 8/2014 | Bontu | H04W 36/0094 370/252 |
| 2014/0362793 A1 | 12/2014 | Chai et al. | |
| 2015/0092655 A1* | 4/2015 | Liao | H04J 11/005 370/312 |
| 2015/0131553 A1* | 5/2015 | Centonza | H04W 24/10 370/329 |

FOREIGN PATENT DOCUMENTS

| | | |
|---|---|---|
| WO | 2013/107389 A1 | 7/2013 |
| WO | 2013/115696 A1 | 8/2013 |
| WO | 2013/133630 A1 | 9/2013 |
| WO | 2013/137811 A1 | 9/2013 |

OTHER PUBLICATIONS

Extended European Search Report received for corresponding European Patent Application No. 14191031.5, dated Sep. 8, 2015, 8 pages.

(Continued)

*Primary Examiner* — Asad M Nawaz
*Assistant Examiner* — Saad A. Waqas
(74) *Attorney, Agent, or Firm* — Mintz Levin Cohn Ferris Glovsky and Popeo, P.C.

(57) ABSTRACT

Methods and apparatus, including computer program products, are provided for controlling measurements and, in particular, a type of load-sensitive measurement, such as received signal, received quality (RSRQ), performed by a user equipment. Related apparatus, systems, methods, and articles are also described.

19 Claims, 5 Drawing Sheets

(56) References Cited

OTHER PUBLICATIONS

"3rd Generation Partnership Project; Technical Specification Group Radio Access Network; Evolved Universal Terrestrial Radio Access (E-UTRA); Physical layer; Measurements (Release 11)", 3GPP TS 36.214, v11.1.0, Dec. 2012, pp. 1-14.

"3rd Generation Partnership Project; Technical Specification Group Radio Access Network; Evolved Universal Terrestrial Radio Access (E-UTRA); Requirements for support of radio resource management (Release 12)", 3GPP TS 36.133, v12.1.0, Sep. 2013, pp. 1-801.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331, v11.5.0, Sep. 2013, pp. 1-347.

"Way forward on RSRQ definition", 3GPP TSG-RAN WG4 Meeting #68bis, R4-135673, Oct. 7-11, 2013, pp. 1-3.

PCT application No. PCT/FI2014/050815, "Methods and Apparatus for Network Conditions Measurement", filed on Oct. 31, 2014, 18 pages.

"3rd Generation Partnership Project; Technical Specification Group Radio Access Network; Evolved Universal Terrestrial Radio Access (E-UTRA); LTE physical layer; General description(Release 12)", 3GPP TS 36.201, v12.0.0, Sep. 2014, pp. 1-13.

"3rd Generation Partnership Project; Technical Specification Group Radio Access Network; Evolved Universal Terrestrial Radio Access (E-UTRA); Physical channels and modulation(Release 12)", 3GPP TS 36.211, v12.3.0, Sep. 2014, pp. 1-124.

"3rd Generation Partnership Project; Technical Specification Group Radio Access Network; Evolved Universal Terrestrial Radio Access (E-UTRA); Physical layer procedures(Release 12)", 3GPP TS 36.213, v12.3.0, Sep. 2014, pp. 1-212.

"3rd Generation Partnership Project; Technical Specification Group Radio Access Network; Evolved Universal Terrestrial Radio Access (E-UTRA); Multiplexing and channel coding(Release 12)", 3GPP TS 36.212, v12.2.0, Sep. 2014, pp. 1-89.

Alcatel Lucent, "Comparison of RSRQ Definitions," 3GPP TSG-RAN WG4 Meeting #68bis R4-134769, Riga, Latvia, Oct. 7-11, 2013 (4 pages).

\* cited by examiner

300

---

SENDING MEASUREMENT CONFIGURATION INFORMATION INCLUDING AN INDICATOR REPRESENTATIVE OF WHETHER A FIRST TYPE OF LOAD-SENSITIVE MEASUREMENT OR A SECOND TYPE OF LOAD-SENSITIVE MEASUREMENT SHOULD BE MADE — 310

RECEIVING A FIRST TYPE OF LOAD-SENSITIVE MEASUREMENT OR A SECOND TYPE OF LOAD-SENSITIVE MEASUREMENT MADE IN ACCORDANCE WITH THE SENT INDICATION — 320

FIG. 3

CARRIER-BASED RSRQ METRIC FOR EFFICIENT SMALL CELL OFFLOADING

FIELD

The subject matter described herein relates to wireless communications.

BACKGROUND

Received signal, received quality is a metric, which may be defined in accordance with 3rd Generation Partnership Project; Technical Specification Group Radio Access Network; Evolved Universal Terrestrial Radio Access (E-UTRA); Requirements for support of radio resource management (Release 12, herein after 3GPP TS 36.133, hereinafter the new RSRQ metric). This RSRQ metric (hereinafter the "old RSRQ") may be calculated based on symbols that contain a cell-specific reference signal (CRS). However, a newer version of RSRQ is defined in RAN4, WF R4-135673. The new RSRQ metric may allow networks to more efficiently offload to small cells as the new RSRQ metric may provide a better indication of the actual load at the measured cell, when compared to the old RSRQ metric. Specifically, the new RSRQ is calculated based on a linear average of total received powers in all orthogonal frequency division multiplexing (OFDM) symbols and in a measurement bandwidth of 1 subframe over the number of OFDM symbols in that subframe. This new RSRQ metric is based on a metric used in enhanced inter-cell interference coordination (eICIC), and the reason for generalizing this metric is to enable a simplified user equipment implementation as well as support of only one RSRQ metric type at the user equipment. The new RSRQ definition may use all of the OFDM symbols in the subframe for measuring the RSSI, which may provide a more accurate measure of the actual load in the system, especially under low load conditions (when the system is closer to full load there difference between the two metrics are smaller and they converge).

SUMMARY

Methods and apparatus, including computer program products, are provided for controlling metrics being used at a user equipment.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF THE DRAWINGS

In the drawings,

FIG. 3 depicts an example of a process at a wireless access point for controlling a type of load-sensitive metric, such as RSRQ, being used, in accordance with some exemplary embodiments;

Figure 1:
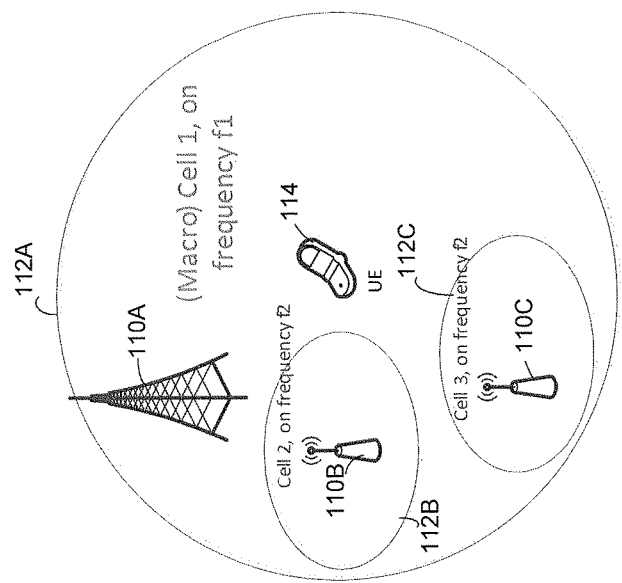
FIG. 1 depicts an example of a system, in accordance with some exemplary embodiments.

Like labels are used to refer to same or similar items in the drawings.

DETAILED DESCRIPTION

Although the new RSRQ metric may be implemented in user equipment, the new RSRQ metric may impact overall network performance, such as mobility performance, depending on whether the old RSRQ or the new RSRQ is being used. The differences between types of RSRQ metrics and their impact may also depend on the details of the type of load metric being used. Furthermore, the differences between RSRQ metrics may cause issues in networks with respect to setting thresholds, parameters, events, as well as making corrections to take into account user equipment using the new RSRQ metric and for example legacy user equipment using the old RSRQ metric.

In some example embodiments, the network may control whether the user equipment applies the new RSRQ or the old RSRQ. For example, the network may signal the user equipment to apply the new RSRQ at certain carrier frequencies and signal the user equipment to apply the old RSRQ with other carrier frequencies. In order to provide offloading or load balancing, the network may for example request the user equipment to measure, using the new RSRQ metric, an indicated carrier frequency serving a small cell, such as a picocell, a femtocell, and a wireless local area network. Moreover, the network may also signal the user equipment to measure, using the old RSRQ metric (or for example, RSRP and/or any other load-sensitive metric) another carrier frequency serving for example a macrocell in order to provide robust mobility.

In some example embodiments, the network may signal the user equipment, so that some cells on a carrier frequency (for example, macrocells) are measured using the old RSRQ metric, while other cells, such as small cells on the same carrier frequency, are measured using the new RSRQ metric. When this is the case, this may allow the network to have different measurement reporting events triggered at different thresholds given the two different metrics. In this example, the old RSRQ metric may have a threshold established for robust macrocell coverage cell, while the new RSRQ metric may have a threshold for offloading.

Although some of the examples disclosed herein refer to the network signaling or configuring the user equipment, so that the user equipment measures the new RSRQ metric on certain carrier frequencies and the old RSRQ for other carriers, metrics other than the old and new RSRQ metrics may be used as well. For example, the network may signal the user equipment to use other load-sensitive metrics for certain carrier frequencies, and the old RSRQ for other carrier frequencies.

In some example embodiments, the network/base station may send a measurement configuration. This measurement configuration may include an indication that a certain carrier frequency is to be measured using the new RSRQ metric, rather than the old RSRQ metric. As such, an RSRQ measurement event is configured at the user equipment for the carrier.

In some example embodiments, the network/base station may send to the user equipment a measurement configuration including an indication that a certain carrier is to be measured using the new RSRQ metric, and this indication may comprise at least one bit. For example, a measurement configuration information element or object may be augmented to include the at least one bit to indicate whether the new RSRQ measurement is configured for a carrier frequency. Alternatively, or additionally, a separate indication may map the RSRQ metric type and measurement object. Alternatively, or additionally, the user equipment may receive an indication of whether to use the old or new RSRQ per measurement ID, cell ID, and the like, to enable using the same event(s) with different metric options.

Although some of the examples described herein refer to providing the indication regarding RSRQ type explicitly, the indication may be signaled to the user equipment implicitly. For example, if the network/base station does not explicitly provide an indication regarding whether to use the old or new RSRQ metric, the user equipment may measure the RSRQ using the old RSRQ metric. However, if the network/base station does explicitly provide the indication to use the new RSRQ metric, the user equipment may measure using the new RSRQ. Alternatively, or additionally, the indication may explicitly indicate with a certain bit(s) or field(s), which of the two RSRQ metrics is to be used.

In a heterogeneous network including macrocells and small cells, the network may, in some example embodiments, identify the cells where the new RSRQ metric is to be used. For example, a list of cell IDs, such as physical cell identities, may per carrier (or more generally) signal the user equipment with the identity of cells where the new RSRQ metric is to be used.

In carrier aggregation (CA) and/or dual connectivity (DC), the network may indicate to the user equipment to make, using the new RSRQ metric, measurements of carriers associated with carrier aggregation (CA) and/or dual connectivity (DC). When this is the case, the network may configure the user equipment to use a more load-sensitive metric, such as the new RSRQ measurement, on a carrier associated with an offloading cell(s), such as small cell(s).

FIG. 1 depicts a system 100 including wireless access points 110A-C, in accordance with some example embodiments.

In the example of FIG. 1, wireless access point 110A may be configured as a base station, such as an eNB base station serving a macrocell 112A (also referred to as a cell and/or a coverage area). Wireless access points 110B-C may be configured to serve small cells 112B-C. For example, small cell 112B may be implemented as a picocell, a femtocell, wireless local area network and the like served by small cell base station 110B. Examples of small cell base stations include a picocell base station, a femtocell base station, a home base station, a WiFi wireless access point, a wireless local area network access point, and a home E-UTRAN node B base station (HeNB) configured in accordance with standards, such as Third Generation Partnership Project (3GPP) Long Term Evolution (LTE). Although LTE is referred to herein, it is merely an example as other standards and technologies may be used as well. Furthermore, small cell base stations may operate on a different carrier frequency than base station 110A serving the larger macrocell 112A, and, as such, when user equipment 114 is coupled to base station 110A serving macrocell 112A, user equipment 114 may need to search different frequencies (than the base station 110A) in order to find the small cell base stations 110B-C, although the cells may operate on some of the same frequencies as well.

Moreover, base station 110A may, in some example embodiments, be implemented as an evolved Node B (eNB) type base station, as noted above. When this is the case, base station 110A may be configured in accordance with standards, including the Long Term Evolution (LTE) standards, such as 3GPP TS 36.201, Evolved Universal Terrestrial Radio Access (E-UTRA); Long Term Evolution (LTE) physical layer; General description, 3GPP TS 36.211, Evolved Universal Terrestrial Radio Access (E-UTRA); Physical channels and modulation, 3GPP TS 36.212, Evolved Universal Terrestrial Radio Access (E-UTRA); Multiplexing and channel coding, 3GPP TS 36.213, Evolved Universal Terrestrial Radio Access (E-UTRA); Physical layer procedures, 3GPP TS 36.214, Evolved Universal Terrestrial Radio Access (E-UTRA); Physical layer-Measurements, and any subsequent additions or revisions to these and other 3GPP series of standards (collectively referred to as LTE standards).

In some exemplary embodiments, the system 100 may include wireless access links. The access links may include downlinks for transmitting to user equipment and an uplink for transmitting from user equipment to a base station. The downlink and uplink may each comprise modulated radio frequency carrying information, such as user data, radio resource control (RRC) messages, user equipment configuration information, measurement reports, and the like.

In some exemplary embodiments, user equipment 114 may be implemented as a mobile device and/or a stationary device. The user equipment 114 are often referred to as, for example, mobile stations, mobile units, subscriber stations, wireless terminals, tablets, smart phones, or the like. A user equipment may be implemented as, for example, a wireless handheld device, a wireless plug-in accessory, or the like. In some cases, user equipment may include a processor, a computer-readable storage medium (for example, memory, storage, and the like), a radio access mechanism, and/or a user interface. User equipment 114 may, in some example embodiments, be configured to operate in a heterogeneous network (also referred to as a HetNet) including small cells, such as small cell 112B, and macrocells, such as cell 112A, operate in carrier aggregation, and/or operate using dual connectivity (for example, having a plurality of connections to the network). In some example implementations configured in accordance with a heterogeneous network, user equipment 114 may access base station 110A, such as an evolved node B base station, serving macrocell 112A, and user equipment 114 may also access small cell base station 110B serving small cell 112B. In the example of the HetNet, the macrocell and small cells may be configured with different frequencies, and the user equipment 114 connected to base station 110A serving the large macrocell 112A may perform inter-frequency measurements to find available offloading opportunities offered by the small cells, such as small cell 112B-C. In some example embodiments, the measurement of the carriers, using the old RSRQ or the new RSRQ, may be in accordance with an indication sent by the network.

Although FIG. 1 depicts three wireless access points 110A-C, three cells 112A-C, and a single user equipment 114, the system 100 may include other quantities and types of wireless access points, cells, and user equipment as well.

Although FIG. 1 depicts an example of a configuration for the base station 110A and small cell base stations 110B-C, base station 110A and small cell base stations 110B-D may be configured in other ways. For example, base station 110A and small cell base stations 110B-C may have wired and/or wireless backhaul links to other network nodes, such as a mobility management entity, other base stations, a radio network controller, a core network, a serving gateway, and the like.

Furthermore, although some of the examples described herein refer to the heterogeneous network (HetNet), carrier aggregation, and dual connectivity (DC), the control of the type of load-sensitive measurement, such as the old and new RSRQ, may be used in other types of networks and devices including those not configured with HetNets, CA, and/or DC.

Figure 2:
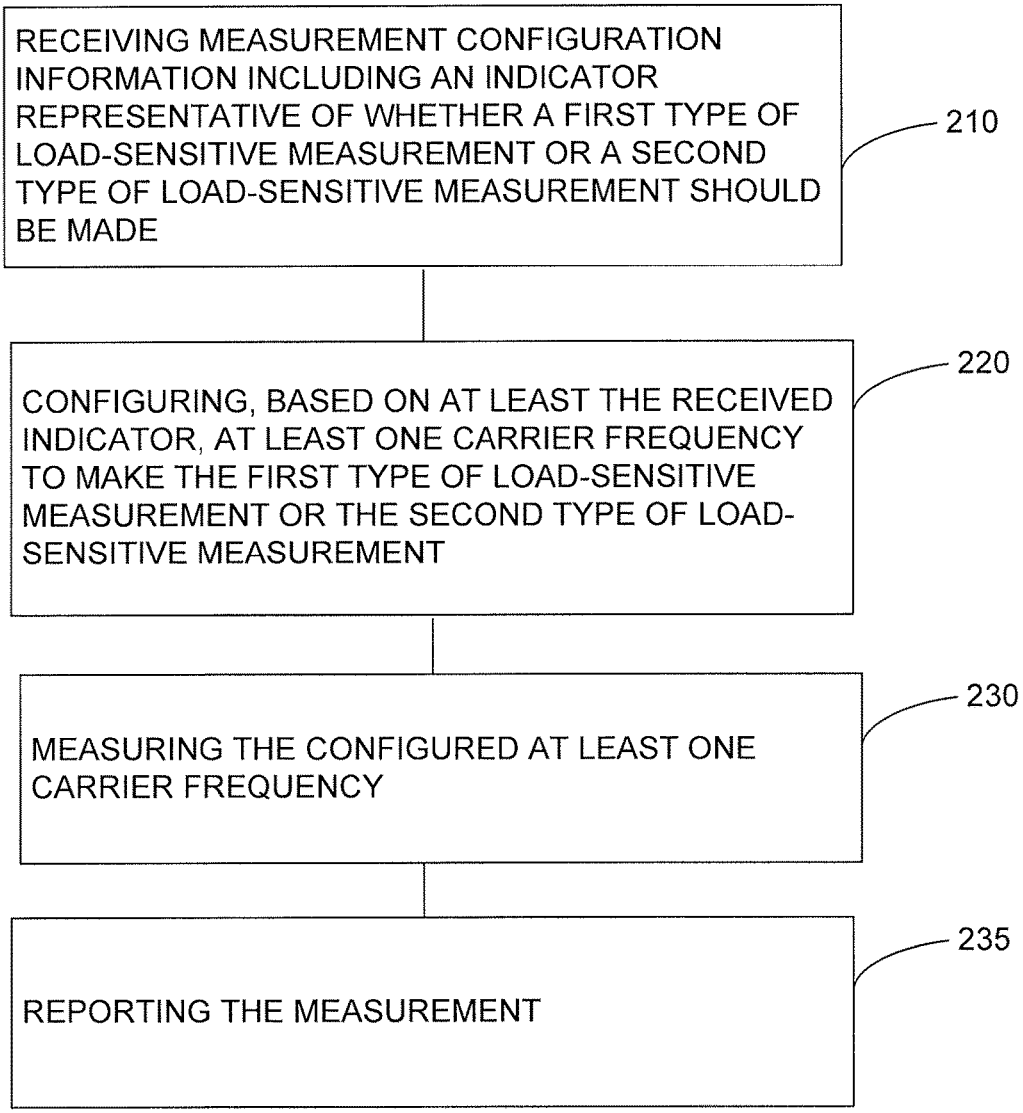
FIG. 2 depicts an example of a process for controlling at a user equipment a type of load-sensitive metric, such as RSRQ, being used, in accordance with some exemplary embodiments.

FIG. 2 depicts an example a process 200 for controlling at user equipment 114, the type of load-sensitive metric, such as the old RSRQ metric or the new RSRQ metric, being used, in accordance with some exemplary embodiments. The description of FIG. 2 also refers to FIG. 1.

At 210, user equipment 114 may receive measurement configuration information including an indicator representative of whether a first type of load-sensitive metric or a second type of load sensitive metric should be used when making measurements. For example, the network including base station 110A may send to user equipment 114 measurement configuration information for one or more carrier frequencies, such as carrier frequency f2 where small cells 110B and C are located. This measurement configuration information may include the indicator regarding the type of load-sensitive measurement to be made at frequency f2 as well as other frequencies. For example, the indicator may represent whether the new RSRQ or the old RSRQ metric should be used when measuring the carrier frequency serving small cells 112B-C. For example, if the network seeks a better load indication at a cell, the indicator may represent to user equipment 114 that the new RSRQ measurement should be used at one or more carrier frequencies.

To further illustrate, the network/base station 110A may send to user equipment 114 measurement configuration information including an indicator that the old RSRQ should be used as well at one or more carrier frequencies. For example, the network may choose to have user equipment 114 measure certain macrocell carrier frequencies, such as frequency f1, using the old RSRQ metric, although the network may also choose to have the user equipment use the old RSRQ metric with a small cell as well.

At 220, the user equipment 114 may configure, based on at least the received indicator, the one or more carrier frequencies, so that the first type of load-sensitive measurement or the second type of load-sensitive measurement is used when measuring certain carrier frequencies. For example, if the received indicator corresponds to frequency f2 and the new RSRQ metric, user equipment 114 configures itself so that frequency f2 is measured, at 230, using the new RSRQ measurement. If the measurement triggers a reporting threshold, the user equipment 114 may then report, at 235, the new RSRQ measurement to the network/base station 110A.

FIG. 3 depicts another example a process 300 for controlling by a network node the type of load-sensitive metric, such as the old RSRQ metric or the new RSRQ metric, in accordance with some exemplary embodiments. The description of FIG. 3 also refers to FIG. 1.

At 310, base station 110A may send measurement configuration information including an indicator representative of whether a first type of load-sensitive measurement or a second type of load measurement should be made. For example, the indicator may represent whether the old RSRQ metric or the new RSRQ metric should be used by user equipment 114 at one or more carrier frequencies.

At 320, the base station 110 may receive from user equipment 114 a measurement report including measurements made in accordance with the indication sent at 310. For example, user equipment 114 may trigger a reporting criteria and send a measurement report for a certain frequency. If that carrier frequency is configured to be made using the new RSRQ metric, the report includes a measurement made using the new RSRQ metric. However, if the carrier frequency is configured to be made using the old RSRQ metric, the report includes a measurement made using the old RSRQ metric.

Although process 300 describes the network node as base station 110A as sending the indicator and the like, other network nodes including the wireless access points serving small cells 112B-C may send the indicator and receive information from the user equipment as well.

Figure 4:
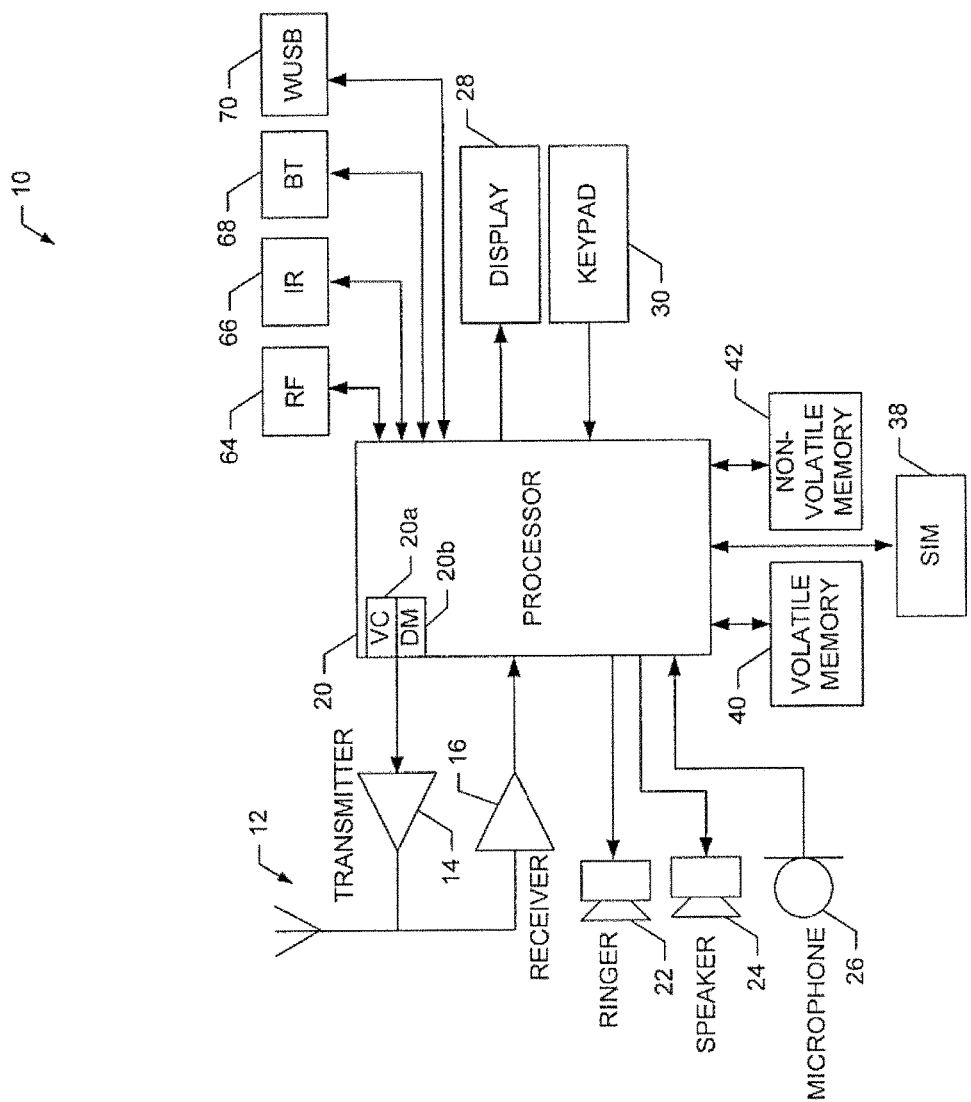
FIG. 4 depicts an example of a user equipment, in accordance with some exemplary embodiments.

FIG. 4 illustrates a block diagram of an apparatus 10, which can be configured as a wireless device, in accordance with some example embodiments. For example, apparatus 10 may be implemented at wireless devices 114A-B. Apparatus 10 may be implemented as a smart phone, mobile station, a mobile unit, a subscriber station, a wireless terminal, a tablet, a wireless plug-in accessory, or any other device with a short-range transceiver, such as Bluetooth, Bluetooth Low Energy, and the like. In some example embodiments, one or more portions of the apparatus 10 may be incorporated into a media player, such as a television, wireless speaker, and the like.

The apparatus 10 may include at least one antenna 12 in communication with a transmitter 14 and a receiver 16. Alternatively transmit and receive antennas may be separate.

The apparatus 10 may also include a processor 20 configured to provide signals to, and receive signals from, the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 4 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 4, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth (BT) transceiver 68 operating using Bluetooth wireless technology, a wireless universal serial bus (USB) transceiver 70, a Bluetooth Low Energy link, ZigBee link, a cellular device-to-device link, a wireless local area link, a Wi-Fi link, and/or any other short-range radio technology. In this regard, the apparatus 10 and, in particular, the short-range transceiver may be capable of transmitting data to and/or receiving data from electronic devices within the proximity of the apparatus, such as within 10 meters, for example. The apparatus 10 including the WiFi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as an international mobile equipment identification (IMEI) code, capable of uniquely identifying apparatus 10. The functions may include one or more of the operations disclosed herein with respect to the user equipment and devices, such as the functions disclosed at process 200, and any other operations disclosed with respect to the user equipment. For example, the user equipment may receive measurement configuration information including an indication of which type of load-sensitive metric to use when measuring certain carrier frequencies; measure in accordance with the indication; and/or report the measurements to the network. The memories may comprise an identifier, such as an international mobile equipment identification (IMEI) code, capable of uniquely identifying apparatus 10. In some example embodiments, the processor 20 may be configured using computer code stored at memory 40 and/or 42 to enable operations disclosed with respect to the user equipment.

Figure 5:
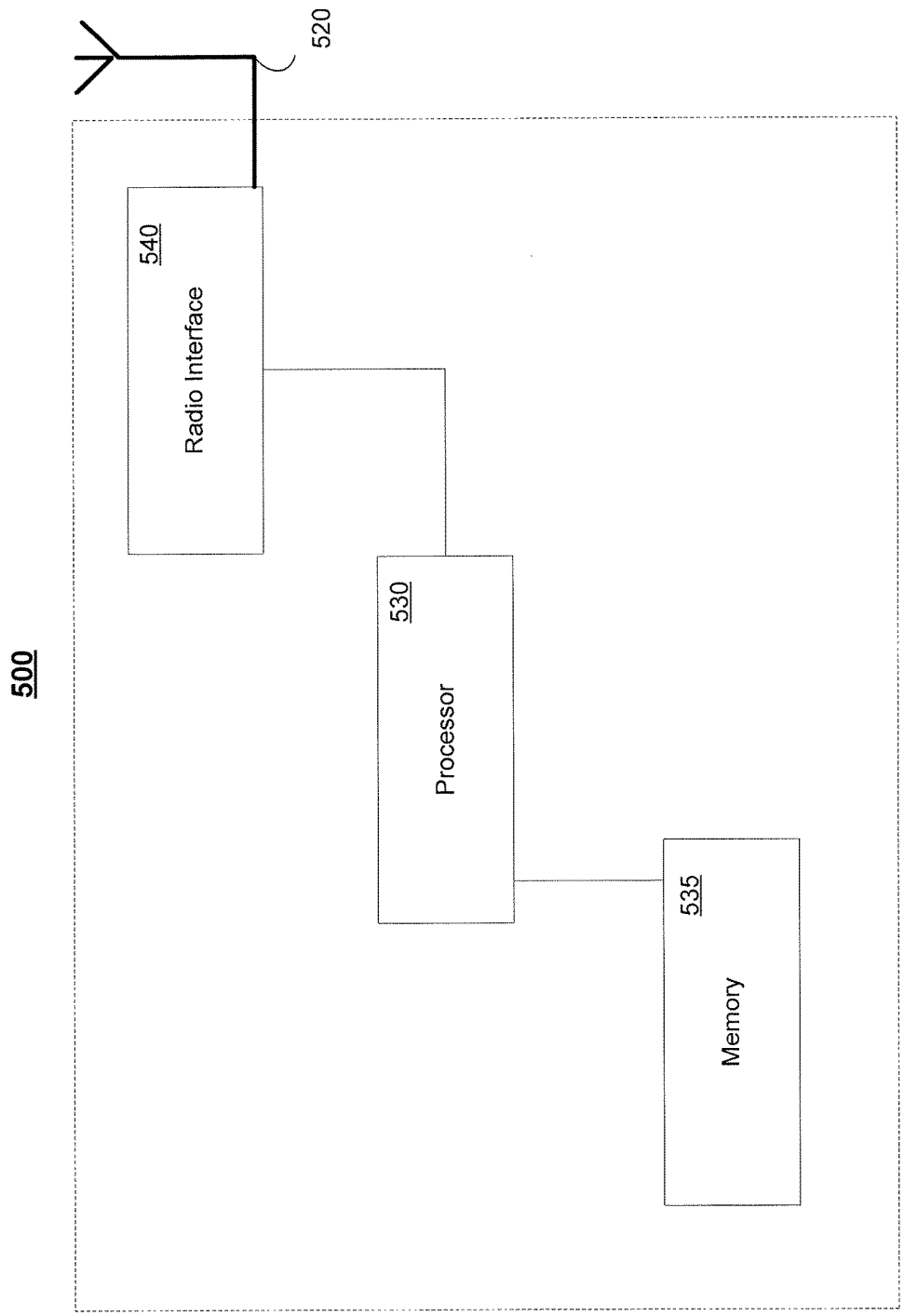
FIG. 5 depicts an example of a wireless access point, in accordance with some exemplary embodiments.

FIG. 5 depicts an example implementation of a network node 500, such as base stations, wireless access points, and the like. The network node 500 may include one or more antennas 520 configured to transmit via a downlink and configured to receive uplinks via the antenna(s) 520. The network node 500 may further include a plurality of radio interfaces 540 coupled to the antenna 520. The radio interfaces may correspond one or more of the following: Long Term Evolution (LTE, or E-UTRAN), Third Generation (3G, UTRAN, or high speed packet access (HSPA)), Global System for Mobile communications (GSM), wireless local area network (WLAN) technology, such as 802.11 WiFi and/or the like, Bluetooth, Bluetooth low energy (BT-LE), near field communications (NFC), and any other radio technologies. The radio interface 540 may further include other components, such as filters, converters (for example, digital-to-analog converters and the like), mappers, a Fast Fourier Transform (FFT) module, and the like, to generate symbols for a transmission via one or more downlinks and to receive symbols (for example, via an uplink). The network node 500 may further include one or more processors, such as processor 530, for controlling the network node 500 and for accessing and executing program code stored in memory 535. In some example embodiments, memory 535 includes code, which when executed by at least one processor causes one or more of the operations described herein with respect to network node, such as a base station, access point, and the like. For example, network node 500 may send measurement configuration information including an indication of which type of load-sensitive metric to be used at a user equipment when measuring certain carrier frequencies and receive the corresponding measurements, and perform any other operation disclosed herein with respect to the network node.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIGS. 4 and 5. A computer-readable medium may comprise a non-transitory computer-readable storage medium that may be any media that can contain or store the instructions for use by or in connection with an instruction execution system, apparatus, or device, such as a computer. In addition, some of the embodiments disclosed herein include computer programs configured to cause methods as disclosed herein.

Without in any way limiting the scope, interpretation, or application of the claims appearing below, a technical effect of one or more of the example embodiments disclosed herein is enhanced control of RSRQ measurements. Without in any way limiting the scope, interpretation, or application of the claims appearing below, another technical effect of one or more of the example embodiments disclosed herein is enhanced control of offloading, mobility, and the like. Without in any way limiting the scope, interpretation, or application of the claims appearing below, yet another technical effect of one or more of the example embodiments disclosed herein is selectively applying the new RSRQ measurement to cells and carrier frequencies where a load indicative metric is more appropriate.

In some example embodiments, a user equipment may receive a measurement configuration including an indicator representative of whether a first type of load-sensitive measurement or a second type of load-sensitive measurement is to be performed by the user equipment, and may configure, based on the received indication, a measurement of at least one carrier frequency.

The first type of load sensitive measurement may include a received signal, receive quality measurement made by determining a linear average of total received powers in orthogonal frequency division multiplexing symbols in a measurement bandwidth of a subframe over a quantity of OFDM symbols in the subframe. The second type of load sensitive measurement may include a received signal, receive quality measurement made based on a cell specific reference signal. The user equipment may be configured to make the measurement using the first type of load sensitive measurement, when the indicator includes at least one bit indicating that the first type of load-sensitive measurement is to be used for the at least one carrier frequency. The user equipment may be configured to make the measurement using the second type of load sensitive measurement, when the indicator includes at least one bit indicating that the second type of load-sensitive measurement is to be used for the at least one carrier frequency.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least."

What is claimed:
1. A method comprising:
  receiving, at a user equipment and from a base station, an indicator representative of whether a first type of reference signal received quality measurement or a second type of reference signal received quality measurement is to be used for reference signal received quality measurements;
  measuring, by the user equipment and in response to the indicator indicating the first type of reference signal received quality measurement associated with an offloading cell, over all orthogonal frequency division multiplexing symbols included in a bandwidth of a subframe to determine the first type of reference signal received quality measurement, the bandwidth including all the orthogonal frequency division multiplexing symbols including first symbols with a reference signal and second symbols without the reference signal;

measuring, by the user equipment and in response to the indicator indicating the second type of reference signal received quality measurement, over a subset of all the orthogonal frequency division multiplexing symbols included in the bandwidth of the subframe to determine the second type of reference signal received quality measurement, the subset comprising only the first symbols with the reference signal; and reporting, by the user equipment and to the base station, information indicative of the first type or the second type of reference signal received quality measurement.

2. The method of claim 1, wherein the first type is applied, in response to the indicator indicating that the first type is to be used, to measurements of one or more carriers, one or more cells at the one or more carriers, or a combination of both.

3. The method of claim 1, wherein the second type is a default type of metric to be used, in response to the indicator not explicitly indicating the first type.

4. The method of claim 1, further comprising:
determining, when the indicator indicates that the first type is to be used, the reference signal received quality measurements based on the measuring over all the orthogonal frequency division multiplexing symbols included in the bandwidth of the subframe; and
determining, when the indicator indicates that the second type is to be used, the reference signal received quality measurements based on the measuring over the subset.

5. The method of claim 1, wherein the reference signal comprises a cell-specific reference signal.

6. An apparatus comprising:
at least one processor circuitry; and
at least one memory circuitry including computer program code, the at least one memory and the computer program code configured to, with the at least one processor, cause the apparatus to at least:
receive, from a base station, an indicator representative of whether a first type reference signal received quality measurement or a second type of reference signal received quality measurement is to be used for reference signal received quality measurements;
measure, when the indicator indicates the first type of reference signal received quality measurement associated with an offloading cell, over all orthogonal frequency division multiplexing symbols included in a bandwidth of a subframe to determine the first type of reference signal received quality measurement, the bandwidth including all the orthogonal frequency division multiplexing symbols including first symbols with a reference signal and second symbols without the reference signal;
measure, when the indicator indicates the second type of reference signal received quality measurement, over a subset of all the orthogonal frequency division multiplexing symbols included in the bandwidth of the subframe to determine the second type of reference signal received quality measurement, the subset comprising the first symbols with the only reference signal; and
report, to the base station, information indicative of the first type or the second type of reference signal received quality measurement.

7. The apparatus of claim 6, wherein when the indicator indicates the first type, the first type is applied to measurements of one or more carriers, one or more cells at the one or more carriers, or a combination of both.

8. The apparatus of claim 7, wherein the one or more carriers include all of the carriers allocated to the apparatus.

9. The apparatus of claim 7, wherein the indicator is specific to the apparatus.

10. The apparatus of claim 7, wherein the one or more carriers is associated with one or more offloading cells.

11. The apparatus of claim 6, wherein the second type is a default type of metric to be used when the indicator does not explicitly indicate the first type.

12. The apparatus of claim 6, wherein the apparatus is further caused to at least:
determine, when the indicator indicates that the first type is to be used, the reference signal received quality measurements based on the measurement over all the orthogonal frequency division multiplexing symbols included in the bandwidth of the subframe.

13. The apparatus of claim 6, wherein the apparatus is further caused to at least:
determine, when the indicator indicates that the second type is to be used, the reference signal received quality measurements based on the measurement over the subset.

14. The apparatus of claim 6, wherein the reference signal comprises a cell-specific reference signal.

15. The apparatus of claim 6, wherein the subframe comprises a subframe dedicated for the received signal received quality measurements.

16. A non-transitory computer-readable medium comprising instructions which, when executed by at least one processor circuitry, result in operations comprising:
receiving, at a user equipment and from a base station, an indicator representative of whether a first type of reference signal received quality measurement or a second type of reference signal received quality measurement is to be used for reference signal received quality measurements;
measuring, by the user equipment and in response to the indicator indicating the first type of reference signal received quality measurement associated with an offloading cell, over all orthogonal frequency division multiplexing symbols included in a bandwidth of a subframe to determine the first type of reference signal received quality measurement, the bandwidth including all the orthogonal frequency division multiplexing symbols including first symbols with a reference signal and second symbols without the reference signal;
measuring, by the user equipment and in response to the indicator indicating the second type of reference signal received quality measurement, over a subset of all the orthogonal frequency division multiplexing symbols included in the bandwidth of the subframe to determine the second type of reference signal received quality measurement, the subset comprising only the first symbols with the reference signal; and
reporting, by the user equipment and to the base station, information indicative of the first type or the second type of reference signal received quality measurement.

17. The non-transitory computer-readable medium of claim 16, wherein the first type is applied, in response to the indicator indicating that the first type is to be used, to measurements of one or more carriers, one or more cells at the one or more carriers, or a combination of both.

18. The non-transitory computer-readable medium of claim 16, wherein the second type is a default type of metric to be used, in response to the indicator not explicitly indicating the first type.

19. The non-transitory computer-readable medium of claim 16, wherein the operations further comprise:
    determining, when the indicator indicates that the first type is to be used, the reference signal received quality measurements based on the measuring over all the orthogonal frequency division multiplexing symbols included in the bandwidth of the subframe; and
    determining, when the indicator indicates that the second type is to be used, the reference signal received quality measurements based on the measuring over the subset.

* * * * *